Nov. 8, 1955
G. H. STICKNEY
2,722,804
TRACTOR HYDRAULIC SYSTEM WITH DELAYED
REMOTE CYLINDER LIFT AND ENTRY
Filed March 19, 1954
3 Sheets-Sheet 1
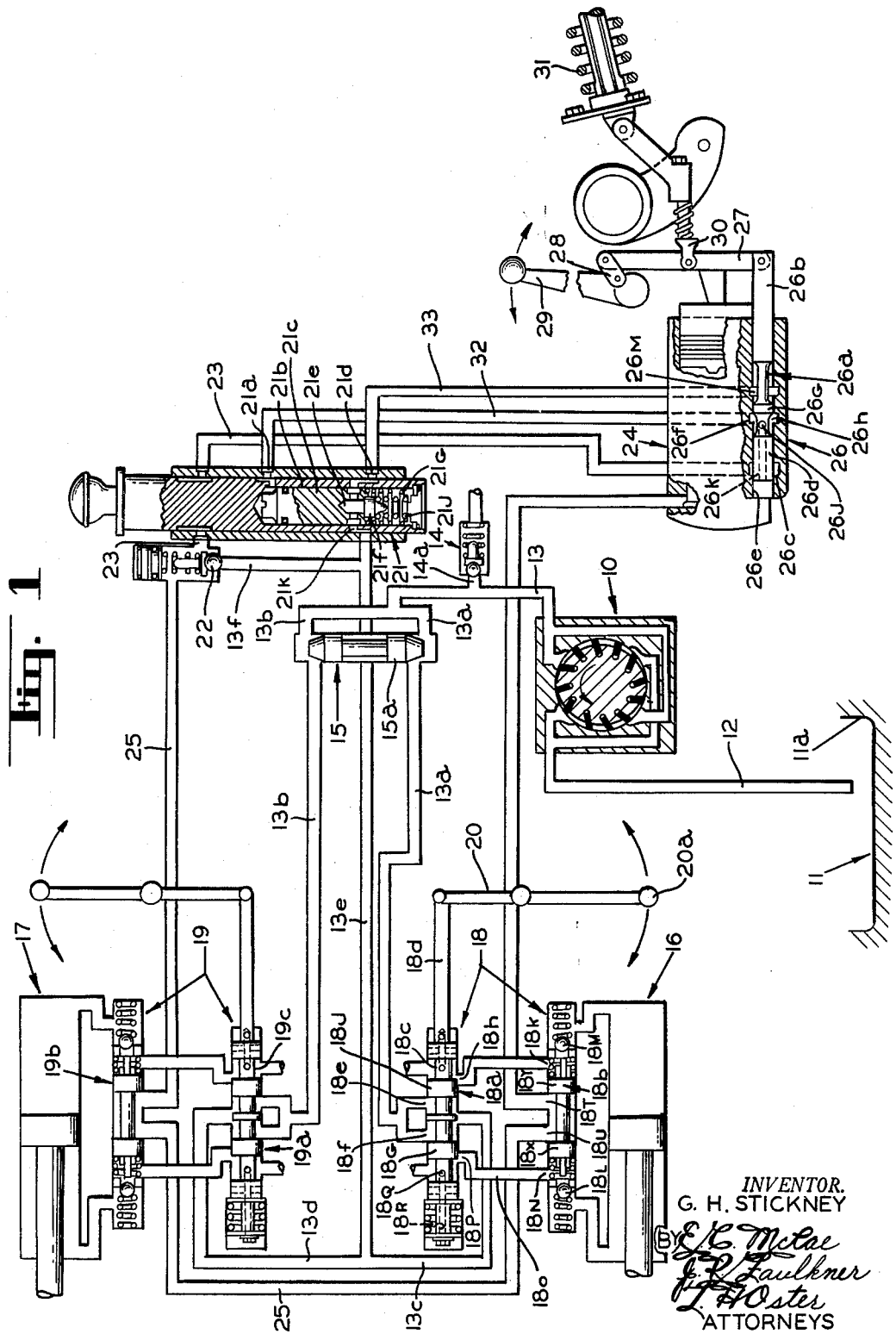
*INVENTOR.*
G. H. STICKNEY
BY E. C. McRae
J. R. Faulkner
F. T. Oster
ATTORNEYS

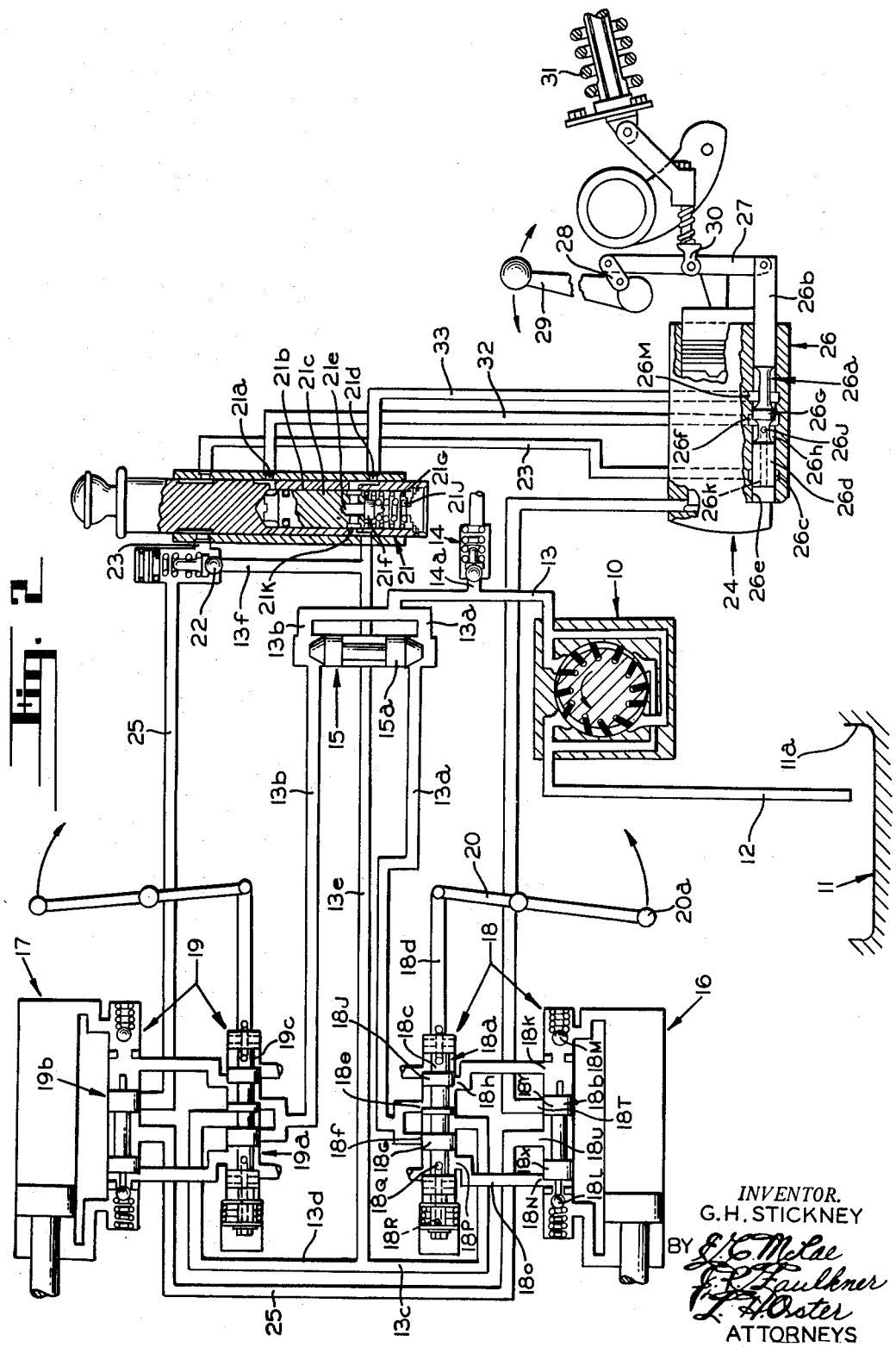

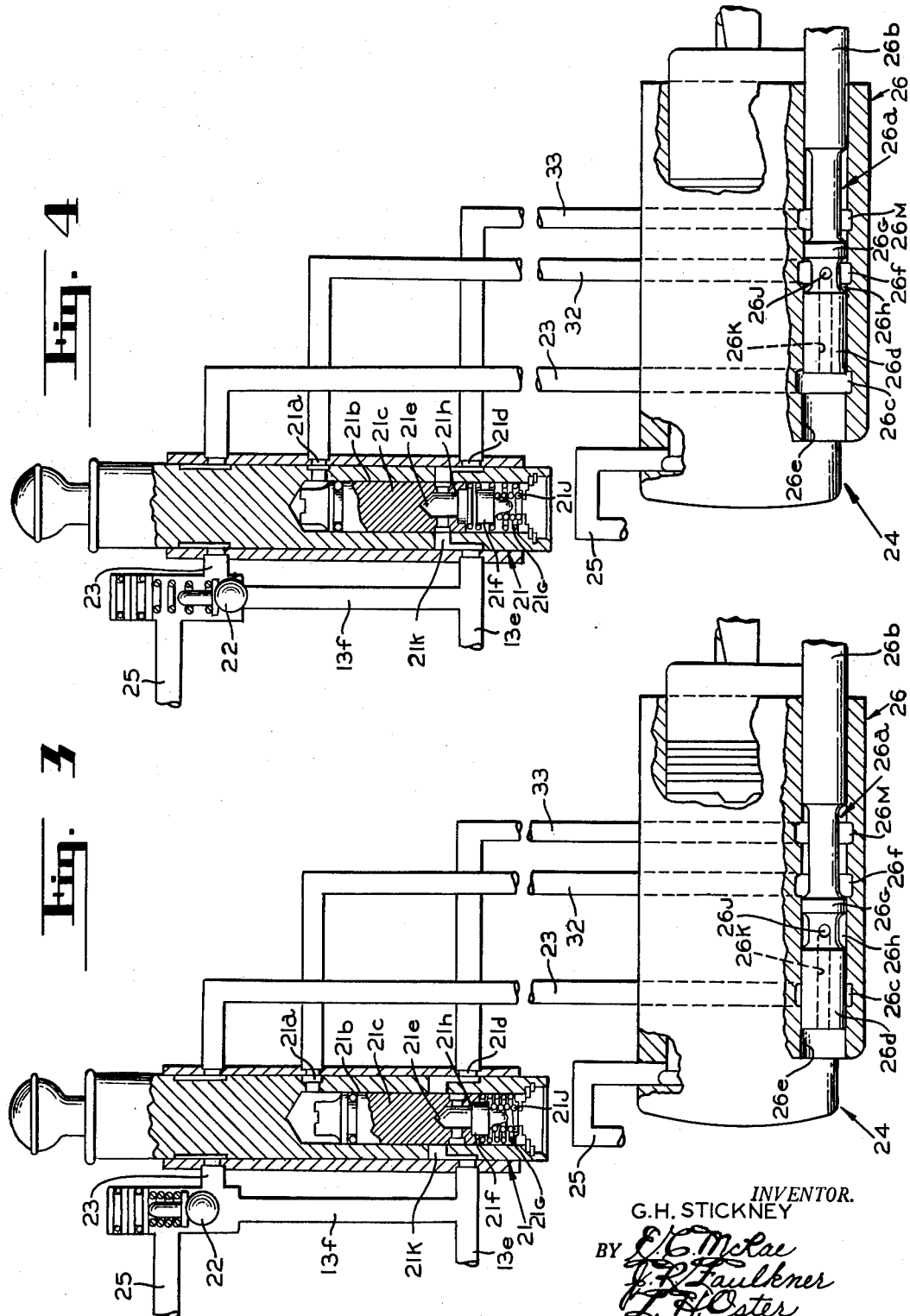

United States Patent Office 2,722,804
Patented Nov. 8, 1955

2,722,804

TRACTOR HYDRAULIC SYSTEM WITH DELAYED REMOTE CYLINDER LIFT AND ENTRY

George H. Stickney, Royal Oak, Mich., assignor to Ford Motor Company, Dearborn, Mich., a corporation of Delaware Application March 19, 1954, Serial No. 417,465

5 Claims. (Cl. 60—52)

This invention relates to an improved hydraulic system for agricultural type tractors, particularly to that type tractor incorporating a primary hydraulic ram and one or more secondary hydraulic rams for operating specialized implements or groups of implements.

It has been customary to provide mounted cultivators for tractors which are constructed with three principal elements, respectively, a pair of forward elements which respectively mount on opposite sides of the tractor, and a rear cultivating element which is primarily utilized for eradicating the wheel marks of the tractor. When operating this type of cultivator in fields where row crops are planted on the contour, it is often necessary that the two side mounted cultivating elements be capable of independent control so that one element may be lifted from or lowered to contact with the ground prior to the other element. Additionally, in entering or leaving any cultivated field, it is always desirable that the two forward mounted elements be actuated ahead of the rear mounted elements; thus, when the tractor first enters the field, the forward cultivating element should be immediately dropped into engagement with the ground but it is unnecessary and often undesirable for the rear mounted cultivating elements to engage the ground until the tractor rear wheels have entered the rows. Conversely, when leaving the field at the end of the row, it is desirable that the forward mounted elements be raised as the front of the tractor passes off the end of the row but that the rear mounted element not be raised until the tractor rear wheels have passed out of the row.

It has been heretofore proposed that separate hydraulic rams be utilized to respectively control the two side mounted front cultivating units as well as the rear mounted units. However, the hydraulic control arrangements heretofore available have not been entirely satisfactory in that they fail to provide desired flexibility of operation of the various tractor rams and, more particularly they did not provide both independent and concurrent operation of the side mounted units as well as sequential operation of the side mounted units with respect to the rear mounted unit. Similar problems arise in other implements where it is necessary to provide independent or sequential operation of a primary ram with respect to one or more secondary rams.

Accordingly, it is an object of this invention to provide an improved hydraulic control system for tractors of the agricultural type.

It is a further object of this invention to provide an improved hydraulic control system for tractors or other devices wherein a primary ram and one or more secondary hydraulic rams are required to be controlled either concurrently, independently, or sequentially.

The specific nature of this invention, as well as other objects and advantages thereof, will become apparent to those skilled in the art from the following detailed description taken in conjunction with the annexed sheets of drawings, on which, by way of preferred example only, is illustrated one embodiment of this invention.

On the drawings:

Figure 1 is a schematic hydraulic circuit diagram of a hydraulic control system embodying this invention including a primary ram, a pair of secondary rams and control valves respectively associated with such rams with all of such control valves shown in their neutral position.

Figure 2 is a view similar to Figure 1 but wherein the control valves of the secondary rams are shifted so as to permit actuation of both secondary rams of the system.

Figure 3 is an enlarged fragmentary view of the low pressure relief valve and the primary ram and primary control valve unit in a raise position with parts broken away and in section for clarity.

Figure 4 is a view similar to Figure 3 but wherein the primary control valve unit and the primary ram are in a lower position.

As shown on the drawings:

While not limited thereto, a hydraulic control system embodying this invention is particularly adapted for use with a pump of the constantly operating type. Such pump is indicated by the numeral 10 on the drawings and has its inlet connected to a suitable sump or reservoir 11 by a conduit 12. As is conventional in tractor hydraulic systems, the sump 11 is preferably defined by a casing 11a forming part of the tractor body and all of the various control elements for the hydraulic system are conventionally mounted in overlying relationship to such casing so that any open ended conduits on such control elements constitute, in effect, connections to the sump.

The discharge side of pump 10 is connected to a main conduit 13 and all pressured fluid for operation of the various elements of the system, is supplied thru conduit 13. A relief valve 14 of conventional construction is connected to conduit 13 by pipe 14a and functions to restrict the maximum pressure developed in the system to a predetermined value.

Main conduit 13 divides into two supplementary conduits 13a and 13b which are respectively connected to opposite ends of a flow equalizer valve 15. Valve 15 is also of conventional construction and incorporates a slidable piston element 15a which functions to maintain a substantially equal division of flow between conduits 13a and 13b respectively.

A pair of secondary rams 16 and 17 are provided and control valve units 18 and 19 are respectively associated with each of such secondary rams. The secondary rams 16 and 17 are substantially identical in construction as are their associated control valve units 18 and 19 so that a detailed description of one of such units will suffice. Each secondary control valve unit 18 and 19 includes a manually shiftable valve 18a and a pressure actuated shuttle valve unit 18b. The manually operable valve element 18a is of conventional configuration including a spool type control element 18c having one end 18d thereof projecting out of the associated valve housing. Such projecting ends are conventionally connected to a manual operating linkage represented by the medially pivoted lever 20 which has a control knob 20a on one end for convenient grasping by the operator. The shuttle valve element 18b is conventionally connected with respect to the secondary ram 16 and the manually operable valve element 18a so that the secondary control valve unit 18 provides three conditions of operation, namely, a neutral position wherein no action takes place in the hydraulic system and the output of the pump 10 is merely bypassed to the sump 11 through low pressure relief valve 21, as will be described, a "raise" position wherein pressured hydraulic fluid is supplied to the corresponding ram and a "lower" position wherein the corresponding ram is actuated in the opposite direction by the movement produced by the "raise" position of the associated control valve. Obviously, where double acting type rams are employed, any operation of a ram involves both the supply of pressured fluid to one side of the ram piston and the withdrawal of fluid trapped on the other side of the ram piston. The terms "raise" and "lower" as used herein are relative only and employed merely to indicate the opposite directions of movement of the various rams, irrespective of whether the rams are physically operating in a vertical direction.

The main fluid supply conduit 13a is connected to the central portion of manually actuated valve 18a as by the ports 18e and 18f. When the spool element 18a is in its neutral position, Figure 1, a connection is provided for fluid flowing thru conduit 13a to a continuation supply conduit 13c. An exactly similar connection of supply conduit 13b with respect to the secondary control valve unit 19 and a continuation supply conduit 13d is provided and the two continuation supply conduits 13c and 13d are joined to a single conduit 13e which in turn connects with a low pressure relief valve 21, which normally functions to maintain a low pressure in the system.

Whenever it is desired to actuate the secondary rams 16 and 17, the corresponding manual control valves 18a or 19a are shifted from the neutral position illustrated in Figure 1 to one of the active positions, for example, the "raise" position illustrated in Figure 2. In such position of valve 18a, for example, the port 18f is closed by piston portion 18g of the valve spool 18c while the port 18e is placed in fluid communication with the port 18h leading to the shuttle valve 18b by virtue of the shift in position of a piston portion 18j on valve spool 18c. Thus the combination supply conduits 13c and 13d are effectively blocked so that the low pressure relief valve 21 is no longer in fluid communication with the pump 10 and pressure immediately begins to build up in the secondary ram portion of the hydraulic system. The application of such pressure through the port 18k of the shuttle valve 18 produces a displacement of the shuttle 18b to open the oppositely located check valve 18l and the adjacent check valve 18m is, of course, opened by the fluid pressure. Thus fluid pressure is supplied to the right hand end of secondary rams 16 and 17 and fluid is withdrawn or displaced from the left hand end of such secondary rams. The flow path for the displaced fluid is through a port 18n adjacent check valve 18l, conduit 18o and port 18p in the manually actuated valve 18a and radial port 18q and axial port 18r provided in the shuttle 18c. Fluid, of course, drains from the open left hand end of manually actuated valve 18a to the sump 11. Exactly similar hydraulic flow takes place in the control valve unit 19 for secondary ram 17 so that both rams are concurrently actuated in one of their operative directions. It should be noted that in either the "raise" or the "lower" positions of the control valve units 18 or 19 that the corresponding continuation supply conduit 13c or 13d is effectively blocked, thus blocking the low pressure relief valve 21 out of the circuit. In fact, if only one of the secondary control valve units 18 or 19 is operated, the low pressure relief valve 21 is blocked out of the circuit through the action of the flow equalizing valve 15 which will effectively cut off the continuation supply conduit 13b if control valve unit 18 is actuated, or cut off continuation supply conduit 13a if control valve unit 19 is actuated.

A branch supply conduit 13f also connects with continuation supply conduit 13e and leads to a check valve unit 22. The discharge side of check valve unit 22 is provided with a primary ram supply conduit 23 which connects with a primary control valve unit 26 and additionally with a conduit 25 which connects to central ports provided on each of the shuttle valve elements 18b and 19b respectively of the secondary control valves 18 and 19. Such connections constitute a pair of axially adjacent ports 18t and 18u thru which uninterrupted fluid flow normally occurs when the associated control valve is in its neutral position but thru which flow is interrupted by either the piston elements 18x or 18y of the shuttle 18b whenever it is in either its "raise" or its "lower" position. A similar series connection of conduit 25 with shuttle valve 19b is provided. Thus, fluid flow can occur thru conduit 25 only when both of the secondary control valves 18 and 19 are in their neutral position. The actuation of either one or both of such control valves to an active position will interrupt fluid flow thru conduit 25. The other end of conduit 25 connects directly with the primary ram 24 and serves both as the fluid supply and drain conduit for such primary ram which is illustrated as being of the single acting type.

It was previously mentioned that a fluid supply conduit 23 leads from the discharge side of check valve 22 to the primary control valve unit 26 which unit may be conveniently mounted in the same casing as the primary ram 24 and includes a shiftable spool element 26a which cooperates with a plurality of axially spaced ports which will be described in more detail later. One end 26b of the shiftable valve element 26a projects out of the cylinder casing and is connected to a conventional type of control linkage reperesented by link 27. The other end of link 27 is connected to a manually operable crank link 28 which is operable by handle 29. The medial portion of lever 27 is pivotally secured to a shiftable draft responsive member 30 which is connected in conventional fashion to a spring 31 which is mounted on the rear central portion of the tractor and arranged to receive draft reaction forces from a connected implement in conventional fashion. Thus the position of control link 27 is controlled jointly by the manual lever 29 and the draft responsive shiftable member 30 so that the valve spool 26a may assume its neutral position with a plurality of different settings of the manual control handle 29 and the draft responsive member 30.

As previously mentioned, the conduit 23 which connects from the discharge side of check valve 22 to the primary control valve 26 enters the primary control valve bore thru a port 26c. Port 26c is controlled by a piston portion 26d on the control valve spool 26a. When the control valve spool 26a is shifted to the right as viewed in Figure 4 on the drawings, the fluid passage 23 is thus effectively connected to the sump by discharging thru the open end of the control valve bore 26e. Accordingly, if both of the secondary control valves 18 and 19 are in their neutral position, fluid will drain from the primary ram 24 thru conduit 25, thru the discharge side of check valve 22 thru conduit 23 thru control valve port 26c and open bore end 26e to the sump 11 and hence the primary ram 24 will be permitted to lower. However, in the event that either one or both of the secondary control valves 18 or 19 are shifted to an active position, either the "raise" or "lower" position, fluid flow thru the conduit 25 will be interrupted and no discharge of fluid from the primary ram 24 can take place until the secondary control valves 18 and 19 are both returned to their neutral positions. In this manner, in the event that both the secondary control valves 18 and 19 and the primary control valve 26 are concurrently actuated, to their "lower" positions, it is assured that the secondary rams 16 and 17 will first effect their lowering movements, after which the control valves 18 and 19 are returned to neutral position, before any lowering movement of the primary ram 24 takes place. If desired, the secondary control valves 18 and 19 may be of the well known type which are pressure biased to remain in either their "raise" or their "lower" positions until the movement of the associated ram in such direction is completed.

Adfditionally, primary control valve 26 is provided with a port 26f which is connected by a conduit 32 to a port 21a of the low pressure relief valve 21. The port 26f is normally only partially lapped by a piston portion 26g of the valve spool 26a. Thus, in the neutral position of spool 26a, port 26f is open to permit fluid to flow into the chamber 26h defined by the reduced diameter portion on the spool 26a between piston portions 26g and 26d. Chamber 26h is connected to the sump 11 by the provision of a radial bore 26j which communicates with an axial bore 26k which extends thru the left hand end of the valve spool 26a.

When valve spool 26a is shifted to the left as viewed in Figure 3 on the drawings, or to its position corresponding to that required to produce a raising movement of a primary ram 24, the port 26f is placed in fluid communication with a port 26m which in turn is connected by a conduit 33 to a port 21d of the low pressure relief valve 21.

Referring now to the Figure 4 which is an enlarged section view of the construction of the low pressure relief valve 21 it will be apparent that such valve comprises a large diameter plunger portion 21c which is slidably mounted in a bore 21b and such plunger has a hollow lower end portion 21e in which a valve piston 21f is slidably mounted. The plunger 21c is biased toward one end of bore 21b by a large spring 21g and the valve piston 21f is biased toward an annular seat 21h by a smaller spring 21j. The continuation supply conduit 13e is in fluid communication with the hollow valve portion 21e by port 21k and direct fluid communication with the chamber 21e is also afforded by the port 21d, which has already been mentioned is connected to conduit 33 leading to primary control valve 26. The bias of small spring 21j is selected to normally maintain a low fluid pressure in the hydraulic system, thus the majority of fluid pumped by pump 10 is by-passed around piston valve 21f to the sump 11, flowing out the open end of the bore 21b under neutral conditions. The top end of valve bore 21b is at sump pressure, being connected therewith by port 21a and conduit 32 and the flow path through primary control valve 26, which has been previously described. However, when the spool 26a of the primary control valve 26 is shifted to the left as viewed in Figure 4 of the drawings to its Figure 3 position, fluid connection is thus established between conduits 33 and 32 and the predetermined low pressure in the hydraulic system is applied to the top end of bore 21b. The application of such pressure produces a downward displacement of the entire plunger 21c and hence interrupts fluid flow between port 21k and the low pressure relief valve chamber 21e. Accordingly, the by-passing action of low pressure relief valve 21 is interrupted and pressure builds up in the hydraulic system sufficient to unseat the check valve 22 and produce a flow of pressured fluid into the primary ram 24 thru conduit 25, provided, of course, that both of the secondary control valves 18 and 19 are in their neutral positions.

In the foregoing description it will be apparent that this invention provides an unusually simple yet effective hydraulic control system for a plurality of hydraulic rams and, more particularly, permits the independent operation of a primary ram, the independent or concurrent operation of a pair of secondary rams, or a sequential operation of the secondary rams with respect to the primary ram.

It will, of course, be understood that various details of construction may be varied through a wide range without departing from the principles of this invention and it is, therefore, not the purpose to limit the patent granted hereon otherwise than necessitated by the scope of the appended claims.

What is claimed is:

1. In a hydraulic system of the type having a constantly operating pump and a two position shuttle valve operable in one position to bypass the pump output to sump and in the other position to cut off flow to sump to produce pressure build up in the system, the improvements comprising a first ram, conduit means including a check valve for connecting said first ram to the discharge side of said pump, a first manual control valve, means for operatively connecting said first manual control valve in hydraulic circuit with said shuttle valve to selectively control the positioning of said shuttle valve, a second hydraulic ram, a second control valve unit defining a plurality of flow paths and having a plurality of valving elements respectively cooperable with said flow paths to control fluid flow therethru, means connecting a first one of said flow paths intermediate said second ram and the discharge side of said pump, said conduit means including a second one of said flow paths, said valving elements having a neutral position arranged with respect to said first and second flow paths to cut off fluid flow in said first flow path while permitting fluid flow in said second path and an active position cutting off fluid flow in said second path while permitting fluid flow in said first path, whereby concurrent operation of said control valves results in operation of only said second ram until said second control valve is returned to its said neutral position.

2. In a tractor hydraulic system having a pump and a sump, a first ram, a first manually shiftable control valve having a "raise," a "lower" and a "neutral" position, means operatively connecting said first control valve in fluid circuit with said pump, sump and said primary ram, whereby both the neutral position and the "lower" position of said first control valve bypasses the fluid output of said pump to sump and the "raise" position of said first control valve directs the fluid output of said pump to said primary ram, said last mentioned means including a drain conduit for returning fluid from said first ram to said sump during "lowering" movements of said first ram, a second hydraulic ram, second manually shiftable control valve having a "raise," a "lower" and a neutral position, means operatively connecting said secondary valve in fluid circuit with said pump, said second hydraulic ram and said sump whereby both the neutral position and the "lower" position of said second control valve bypasses the fluid output of said pump to sump and the "raise" position of said second control valve directs the fluid output of said pump to said second hydraulic ram, said second control valve having a flow path therethru forming part of said drain conduit, and a valve element in said second control valve cooperable with said flow path to cut off fluid flow in said drain conduit only in said "lower" position of said second control valve, whereby concurrent operation of said control valves to said "lower" positions produces only "lowering" movement of said second ram until said second control valve is returned to its said neutral position.

3. In a tractor hydraulic system having a pump and a sump, a first ram, a first manually shiftable control valve having a "raise," a "lower" and a "neutral" position, means operatively connecting said first control valve in fluid circuit with said pump, sump and said primary ram, whereby both the neutral position and the "lower" position of said first control valve bypasses the fluid output of said pump to sump and the "raise" position of said first control valve directs the fluid output of said pump to said primary ram, said last mentioned means including a supply conduit extending to the discharge side of said pump and a drain conduit for returning fluid from said first ram to said sump during lowering movements of said ram, a second hydraulic ram, a second manually shiftable control valve having a "raise," a "lower" and a neutral position, means operatively connecting said secondary valve in fluid circuit with said pump, said second hydraulic ram and said sump whereby both the neutral position of said second control valve bypasses the fluid output of said pump to sump and the "raise" position of said second control valve diverts the fluid output of said pump to said second hydraulic ram, said second control valve having a flow path therethru forming part of said drain conduit, and a valve element in said second control valve cooperable with said flow path to cut off fluid flow in said drain conduit only in said "lower" position of said second control valve, whereby concurrent operation of said control valves to said "lower" positions produces only "lowering" movement of said second ram unit until said second control valve is returned to its said neutral position, said second control valve having a second flow path therethru forming part of said supply conduit, and a second valve element in said second control valve cooperable with said second flow path to cut off fluid flow in said supply conduit only in said "raise" position of said second control valve, whereby concurrent operation of said control valves to said "raise" positions produces only "raising" movement of said second ram until said second control valve is returned to its said neutral position.

4. In a hydraulic system for agricultural tractors of the type having a primary ram and a pair of secondary rams, a pump, and a shiftable control valve associated with each ram and having "raise," "lower" and "neutral" positions for selectively controlling the supply of fluid to said rams, the improvements comprising a fluid supply conduit for each of said control valves, a flow equalizing device operatively connected between said two secondary ram supply conduits and the discharge side of said pump thereby equalizing fluid flow to said secondary rams whenever said secondary control valves are concurrently actuated, each of said secondary control valves having a flow path therethru and a shiftable valve element arranged to cut off fluid flow thru said flow path when said secondary control valve is actuated to its said "raise" position, said flow paths being respectively connected in series relationship with said primary ram supply conduit, whereby concurrent actuation of said control valves to said "raise" position produces only actuation of said secondary rams until both of said secondary control valves are returned to said neutral positions.

5. In a tractor hydraulic system having a pump, a sump, and a single acting primary ram, a primary shiftable control valve having a "raise," a "lower," and a neutral position, means operatively connecting said primary control valve in fluid circuit with said pump, sump and primary ram whereby both the neutral and the "lower" position of said primary control valve effects the bypassing of the fluid output of said pump to said sump and the "raise" position of said primary control valve directs the fluid output of said pump to said primary ram, said last mentioned means including a primary fluid conduit through which fluid is supplied to, or withdrawn from, said ram, a secondary ram, a secondary shiftable control valve having a "raise," a "lower" and a neutral position, means operatively connecting said secondary control valve in fluid circuit with said pump, sump and said secondary ram, whereby both the neutral and "lower" positions of said secondary valve bypasses the fluid output of said pump to sump and the "raise" position of said secondary control valve directs the fluid output of said pump to said secondary ram, said secondary valve including a flow path series connected with said primary fluid conduit, and a valve element cooperable with said flow path and arranged to close said flow path in either said "raise" or "lower" positions of said secondary control valve and to open said flow path in said neutral position of said secondary control valve, whereby concurrent actuation of said control valves to either "raise" or "lower" positions produces operation only of said secondary ram until said secondary control valve is returned to its said neutral position.

No references cited